United States Patent [19]

McDonnell

[11] 4,267,987
[45] May 19, 1981

[54] HELICOPTER AIRBORNE LOAD SYSTEMS AND COMPOSITE AIRCRAFT CONFIGURATIONS

[76] Inventor: William R. McDonnell, 24 Oakleigh La., Ladue, Mo. 63124

[21] Appl. No.: 24,881

[22] Filed: Mar. 29, 1979

[51] Int. Cl.³ .............................................. B64D 5/00
[52] U.S. Cl. .......................................... 244/2; 244/6; 244/137 R
[58] Field of Search ............... 244/2, 3, 6, 12.5, 17.11, 244/63, 135 A, 137 R

[56] References Cited

U.S. PATENT DOCUMENTS

| | | | |
|---|---|---|---|
| 2,471,599 | 5/1949 | Young | 244/2 |
| 2,621,000 | 12/1952 | Robert | 244/63 |
| 2,843,337 | 7/1958 | Bennett | 244/2 |
| 2,859,002 | 11/1958 | Leisy | 244/3 |
| 2,954,185 | 9/1960 | Spratt | 244/3 |
| 3,113,747 | 12/1963 | Smith | 244/3 |
| 3,601,342 | 8/1971 | Piasecki | 244/137 R |
| 3,907,219 | 9/1975 | Pharris | 244/12.5 |

*Primary Examiner*—Charles E. Frankfort
*Attorney, Agent, or Firm*—Gravely, Lieder & Woodruff

[57] ABSTRACT

This invention pertains to helicopter airborne load systems and composite aircraft configurations. The composite aircraft configurations are designed to allow a fixed wing aircraft to take off and land either vertically or in a short ground run when assisted by a rotary winged aircraft such as a helicopter, and includes a maneuverable probe system used to attach two aircraft to form a composite aircraft configuration, the fixed wing aircraft embodying the use of a receptacle or attachment device cooperative with the maneuverable probe to effect the uniting of the aircraft. The helicopter systems airborne includes the use of the probe to cooperate with special external pods capable of carrying loads, fuel and instrumented devices.

3 Claims, 12 Drawing Figures

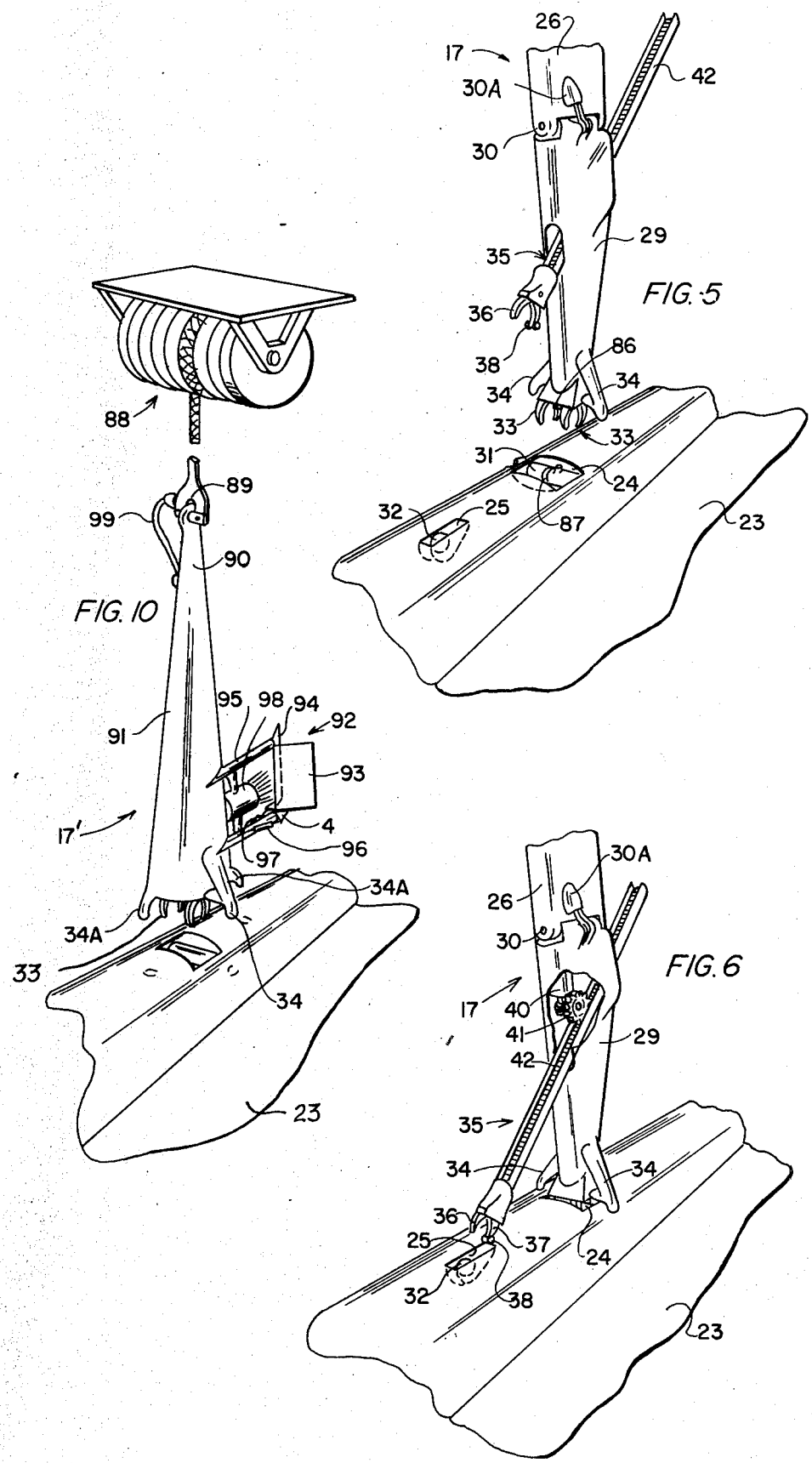

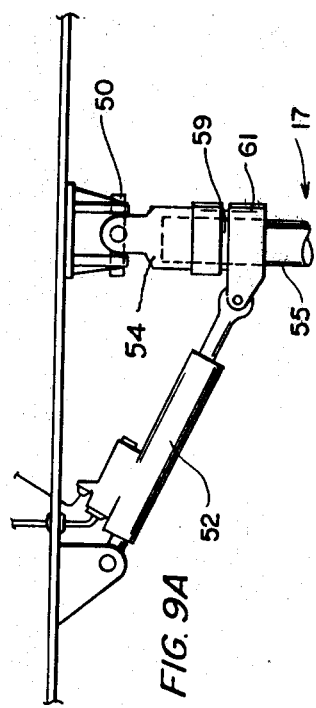
FIG. 9A
FIG. 11
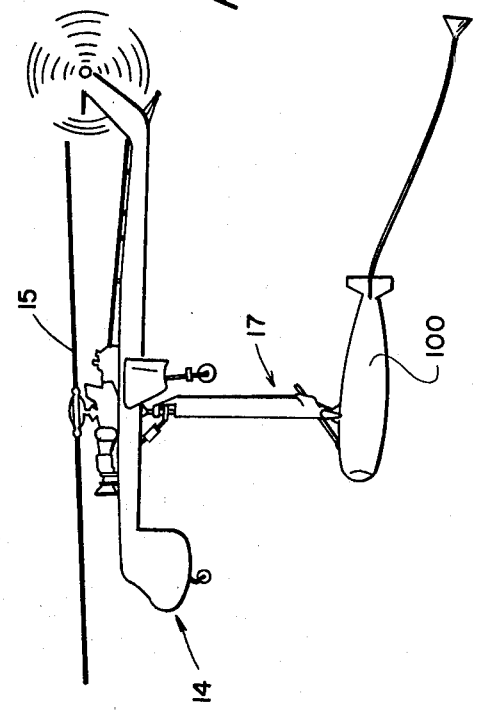

HELICOPTER AIRBORNE LOAD SYSTEMS AND COMPOSITE AIRCRAFT CONFIGURATIONS

BACKGROUND OF THE INVENTION

The concept of a rotary wing-fixed wing composite aircraft system and method of flight was recognized as early as 1958 by Bennett, as set forth in U.S. Pat. No. 2,843,337 which was issued July 15, 1958, and was assigned to Hiller Helicopters. The Bennett patent disclosed a rotary wing aircraft attached above the longitudinal center of gravity of a fixed wing aircraft with the attachment points being close to the main structure of the fixed wing aircraft and with attachment fittings on the rotary wing aircraft housed in leg fairings of a skid type under carriage. The attachment disclosed effected a rigid connection directly between strong points on the upper and lower aircrafts, with an arrangement in which the attachment point on the fixed wing aircraft could be retracted when released for independent flight. In a disclosure by E. F. Andrews, as set forth in U.S. Pat. No. 2,797,881 of July 2, 1957, another rotary wing-fixed wing composite aircraft system was described. In both of these disclosures the attachment means on the rotary wing aircraft was neither extendible nor maneuverable and was rigidly attached to the rotary wing aircraft structure. In addition the engine thrust of the fixed wing aircraft could not be directed or utilized to help lift or assist in the fixed wing aircraft take-off or landing.

Other kinds of composite aircraft such as fixed wing-fixed wing and dirigible-fixed wing systems have also been previously disclosed.

There preceded Bennett the concept of launching and retrieving a small fixed wing aircraft from the bomb bay of a large fixed wing aircraft, as disclosed by Barkey in U.S. Pat. No. 2,653,777, which was issued Sept. 29, 1953. This patent was directed to the mechanism for achieving that result.

Prior to the Bennett and Barkey disclosures, Richardson disclosed, in U.S. Pat. No. 1,869,506 which issued Aug. 2, 1932, an arrangement for catching a powered airplane while in flight from another aircraft, and more particularly disclosed apparatus to permit an operator from within a dirigible to catch and temporarily suspend an aircraft from the underside of the dirigible. The disclosure of the preferred method derived by Richardson was directed to manual control over the securing or mooring means, since the pilots of the respective components were not considered in position to visually superintend the catching operation.

BRIEF SUMMARY OF THE INVENTION

The present invention relates to helicopter airborne load systems and composite aircraft configurations, and more particularly to means rendering the helicopter useful for handling airborne loads or to be part of a configuration that allows a fixed wing aircraft to take off and land with a minimum of ground run.

It is an object of the present invention to utilize a rotary winged aircraft equipped with a maneuverable probe type attachment means to make contact with a fixed wing aircraft for rendering assitance to it in the take off mode or the landing mode, and to effect a substantially vertical movement thereof or to reduce to a minimum the ground run for the fixed wing aircraft.

It is a further object of the present invention to provide a maneuverable probe type attachment means that can be moved between retracted or extended positions by an operator or pilot in the rotary winged aircraft to permit unencumbered take-off of the rotary wing aircraft and extension of the probe to effect a hook up or release of the fixed wing aircraft.

It is a further object of the present invention to provide an extendible attachment means that can permit a safe separation between the rotary wing aircraft and its airborne load or safe spacing relative to a fixed wing aircraft.

It is an additional object of the present invention to utilize the propulsive thrust of the fixed wing aircraft directed vertically, or nearly so, as an assist in the take-off.

Further objects of the present invention will be set forth in the detailed description of the present invention.

BRIEF DESCRIPTION OF THE DRAWINGS

Certain preferred embodiments of the present composite aircraft will be set forth in the accompanying drawings, wherein:

FIG. 5 is a perspective view of a fragmentary portion of the fixed wing aircraft equipped with load bearing means exposed for engagement by the maneuverable probe, a fragmentary portion of which is extended from the rotary wing aircraft;

FIG. 6 is a view similar to FIG. 5 illustrating a more advanced condition in which the principal connection of the maneuverable probe has effected engagement with the load bearing means on the fixed wing aircraft;

FIGS. 9 and 9A are schematic views of the control system for the probe carried by the rotary wing aircraft;

FIG. 10 is a fragmentary perspective view of a modified probe having maneuvering control means, and means to retract or to vary its extended position; and FIG. 11 is an elevational view of a modification in which the helicopter is used as a refueling vehicle by carrying a fuel supply pod for a fixed winged aircraft.

DETAILED DESCRIPTION OF THE EMBODIMENTS

While a composite aircraft system is not new in view of Bennett or Barkey, supra, the present invention embodies improvements of unique type which are useful in a number of different ways. A fixed wing aircraft normally requires a substantial length of runway for take-off and landing. On the other hand a composite aircraft using a rotary wing aircraft capable of aiding the fixed wing aircraft can substantially reduce or eliminate the take-off and landing run as will be set forth hereinafter.

The improvements comprise a maneuverable and retractable and extendible probe means that is operatively carried by the rotary wing aircraft in position to effect attachment to the fixed wing aircraft or to an object such as a load carrying container or object requiring movement from place to place. The maneuverability of the probe means greatly improves the hookup reliability and the extendibility allows a safe separation between the rotary wing and fixed wing aircraft structure.

Another improvement is the utilization of the propulsive thrust of the fixed wing aircraft component of the composite aircraft system directed vertically, as an assist in the take-off. This can be accomplished by controlling the direction of the thrust independently of the aircraft or by bodily positioning the aircraft.

Figure 1:
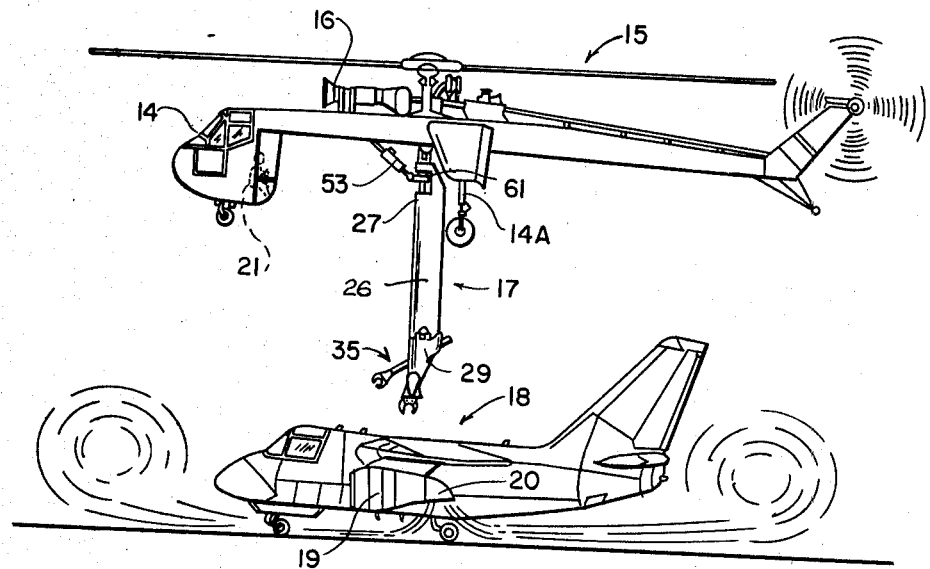
FIG. 1 is an elevations view of the initial hook up of a rotary winged aircraft and a fixed wing aircraft just prior to initiating take-off.
Figure 2:
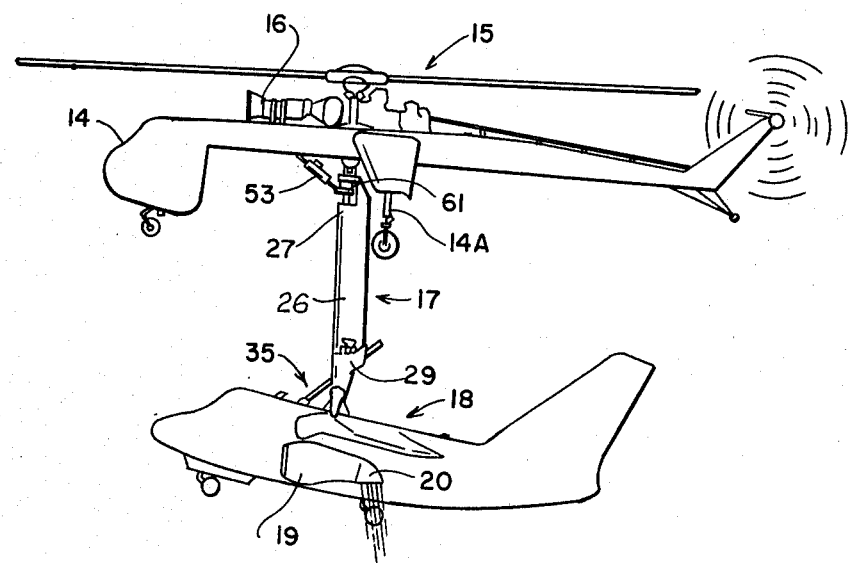
FIG. 2 is a view similar to FIG. 1, but depicting the lifting of the fixed wing aircraft during take-off.

Turning now to FIGS. 1 and 2, there is shown a helicopter 14 with a multibladed rotor 15 driven by a suitable turboshaft power plant 16. A load sustaining probe 17 is operatively extended from the helicopter 14 so as to assume a generally pendent position for the purpose of connection into load bearing means on a fixed wing aircraft 18. The aircraft 18 is provided with jet engines 19 having exhaust thrust deflectors 20 which can be manipulated by the pilot during take-off or landing of the composite aircraft to direct the exhaust downward for additional lift during take-off or during landing.

FIGS. 1 and 2 illustrate a take-off sequence for the aircraft 18 assisted by the helicopter 14. The sequence begins with the helicopter hovering over the stationery fixed wing aircraft 18 so that the load sustaining probe 17 may be maneuvered by an operator 21 (FIG. 1) seated in the helicopter 14 into engagement with suitable load bearing means (later to be disclosed in detail) on the upper surface of the fixed wing aircraft 18. The aircraft 18 will have the thrust deflectors 20 set in the downward position as shown in FIG. 1 so that the jet engine thrust may be used to assist in the take-off. The helicopter 14 after making contact through the probe 17 increases the thrust of its main rotor 15 to lift the fixed wing aircraft 18 substantially vertically off the ground. As shown in FIG. 2 the helicopter 14 has lifted the fixed wing aircraft and can now accelerate with the aircraft 18 generally horizontally up to flight speed prior to release of the probe 17.

The landing sequence for the fixed wing aircraft is substantially the reverse of the take-off sequence. The fixed wing aircraft 18 maneuvers into position beneath the helicopter 14 and the probe 17 is maneuvered into engagement with the load bearing means on the upper surface of the fixed wing aircraft. After attachment of the probe 17 the thrust deflectors 20 on the aircraft 18 can be positioned to direct the exhaust in a downward direction and the helicopter proceeds to lower the aircraft to a substantially vertical landing before disconnecting the probe 17.

Figure 3:
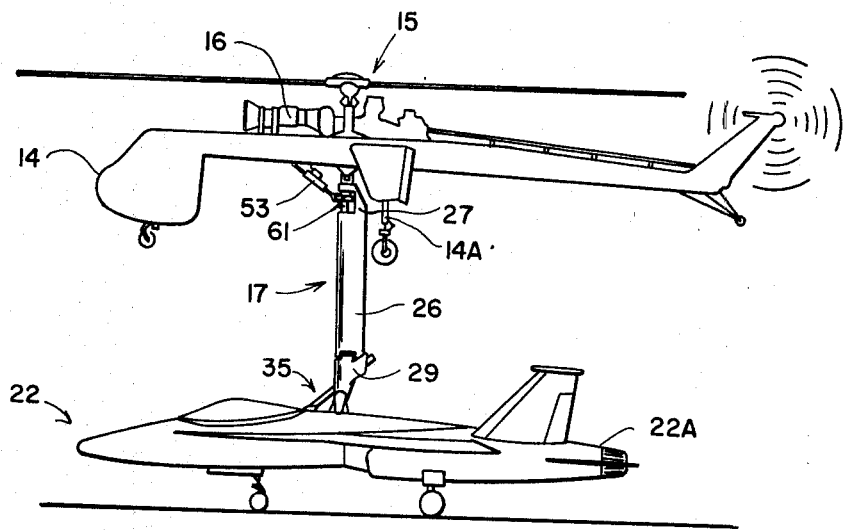
FIG. 3 is a view similar to FIG. 1, but depicting a supersonic type fixed wing aircraft as a component of the composite aircraft.
Figure 4:
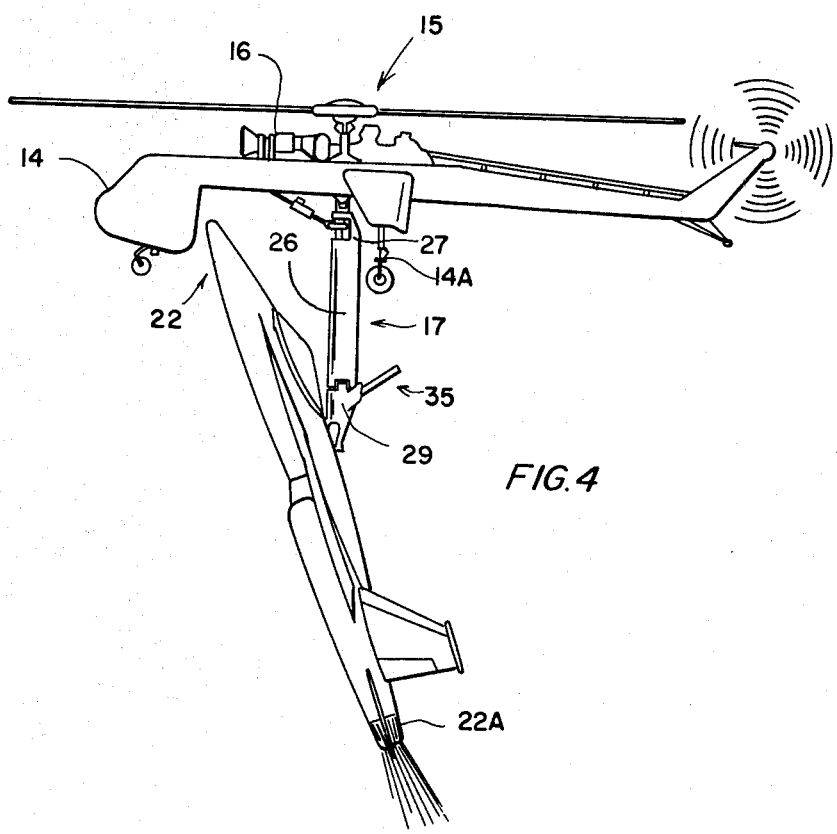
FIG. 4 is a view similar to FIG. 3 in which the jet thrust of the fixed wing aircraft is directed generally vertically during the take-off mode of the composite aircraft by pitching the aircraft nose up.

Turning now to FIGS. 3 and 4 there is shown a modification of a composite aircraft in which the rotary wing aircraft 14 equipped with the probe 17 is joined to a fixed wing aircraft 22 having a fixed position exhaust nozzle 22A, without thrust deflection means. The take-off sequence in this composite configuration, after attachment of the probe 17, begins with the helicopter overspeeding its main rotor 15 so as to gain the necessary additional energy to vertically lift the fixed wing aircraft 22 clear of the ground for a sufficiently long period of time and to an elevation to permit the probe 17 to pitch the aircraft 22 into a position such that the thrust from the jet engine exhaust nozzle 22A may be utilized to assist in the remainder of the take-off sequence and to relieve the helicopter 14 from sustaining the entire weight of the aircraft 22. After reaching a safe altitude, the probe 17, as will appear presently, is operated to allow the aircraft 22 to return to a more normal horizontal flight position so that longitudinal velocity of the composite aircraft can reach a speed necessary for the aircraft 22 to sustain itself in horizontal flight. When this speed is reached the probe 17 is disconnected and the aircraft 22 is then in free flight.

The landing sequence for the composite aircraft of FIGS. 3 and 4 is substantially the reverse of the take-off sequence if the aircraft 22 is too heavy for the helicopter 14 to lower to the ground in a horizontal attitude. The composite aircraft must be at a sufficient elevation to permit the positioning of the aircraft 22 pitched in a nose up attitude with the jet engines running to produce thrust assistance from nozzle 22A until just prior to the point of touchdown when the aircraft 22 would be rotated back to the necessary horizontal attitude for landing. During the critical landing maneuver the main rotor 15 of the helicopter would be overspeeded to provide a burst of power required to sustain the weight of the aircraft 22 after its change of attitude from the nose up pitched position (illustrated in FIG. 4) to the horizontal landing position (illustrated in FIG. 3).

Turning now to FIGS. 5 and 6 there has been illustrated one form of structural arrangement for the probe 17 and one example for the attachment means necessarily provided in the structure of the fixed wing aircraft, whether it is an aircraft 18 as illustrated in FIG. 1 or as shown at 22 in FIG. 3. Other suitable attachment means may be employed, so the following description is given by way of an example. In the present example the fixed wing aircraft fuselage 23 is provided with a receptacle 24 in the upper surface of the fuselage close to the center of gravity, and a second receptacle 25 is provided in a position forward of the receptacle 24. These receptacles are located on the longitudinal center line of the fixed wing aircraft. The probe 17 comprises an elongated streamlined (airfoil configuration when seen in section) body 26, the upper end 27 of which is pivotally connected into the helicopter 14 at suitable attachment assembly 28 (see FIG. 9). The probe 17 in this form needs to be sufficiently longer than the landing gear 14A so there will be a safe separation between the rotary and fixed wing aircrafts when the probe is extended from its retracted position. The lower end of the housing 26 is formed so as to be hingedly connected to a member 29 which houses operating mechanism to be described. The hinge connection includes the hinge pin 30 having its axis substantially parallel to the longitudinal axis of the aircraft fuselage 23 so that the member 29 is capable of pivoting laterally relative to the longitudinal axis. Roll damper device 30A is operatively connected between the members 26 and 29 and is streamlined within member 26.

Figure 7:
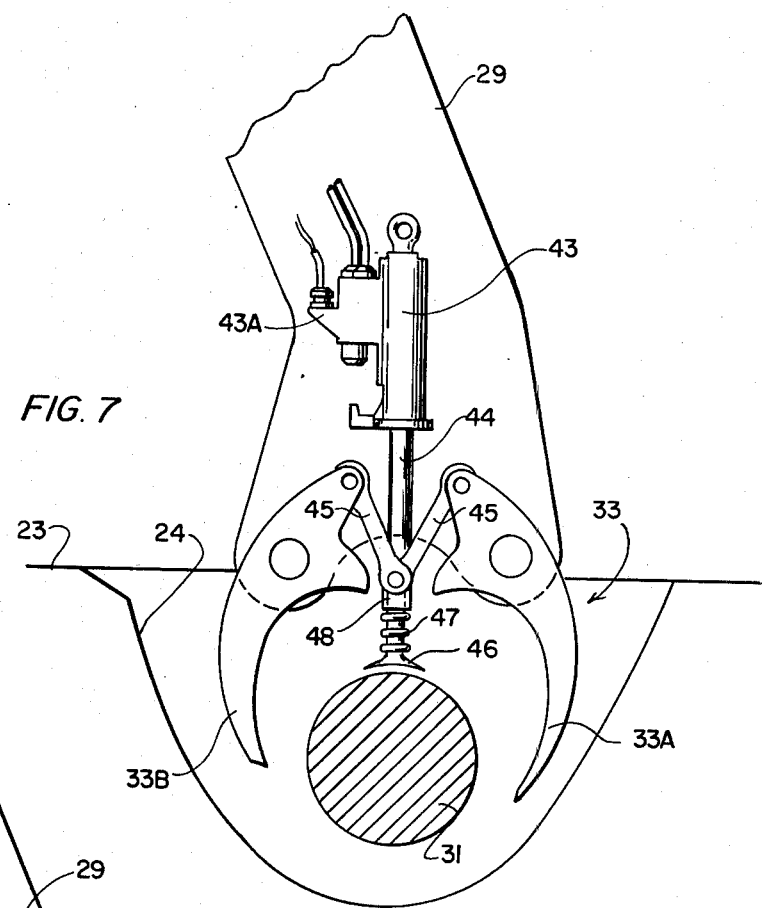
FIG. 7 and FIG. 8 are fragmentary sectional views showing the progressive operation of the maneuverable probe in effecting connections with the load bearing means.

It can be seen in FIGS. 5 and 7 that the fuselage 23 has the receptacle 24 provided with a crossbar 31, and a second crossbar 32 is located in the receptacle 25. The lower end of the probe member 29 carries attachment means in the form of a pair of jaws 33 which are adapted to engage or effect attachment with the bar 31 as the probe member 29 aligns itself over the receptacle 24. The member 29 is also provided with lateral stabilizing fins 34 for assuring a substantial fixed engagement of the probe member 29 with the fuselage 23. It can be seen that the probe member 29 is provided with an aircraft tilt actuating member 35 which is directed at an angle to the member 29 and is adapted to be extensible from the member so as to bring another attachment means in the form of a device 36 carried at its outer end into attachment with the member 32 in receptacle 25. The claw member 36 has one of its elements 37 provided with a suitable roller or skid 38 which will permit the element 37 to move along the skin surface of the fuselage and ride into the receptacle 25. The extension and retraction of the member 35 is effected by a suitable motor 40 mounted in the probe 29 and engaged with a gear 41 which, in turn, engages a rack bar 42 fixed in the member 35. The motor 40 is reversible so as to drive the gear in directions to extend or retract the member 35. The member 35 is shown in its retracted position in FIG. 5 and in its extended position in FIG. 6. The function of the member 35 is to effect the necessary pitch change in the fixed wing aircraft 23 as is shown by comparing FIGS. 3 and 4. The member 35 may not be used in all cases, but as seen in FIGS. 1 and 2 it may aid in stabilizing and controlling the pitch attitude of the fixed wing aircraft 18.

Figure 8:
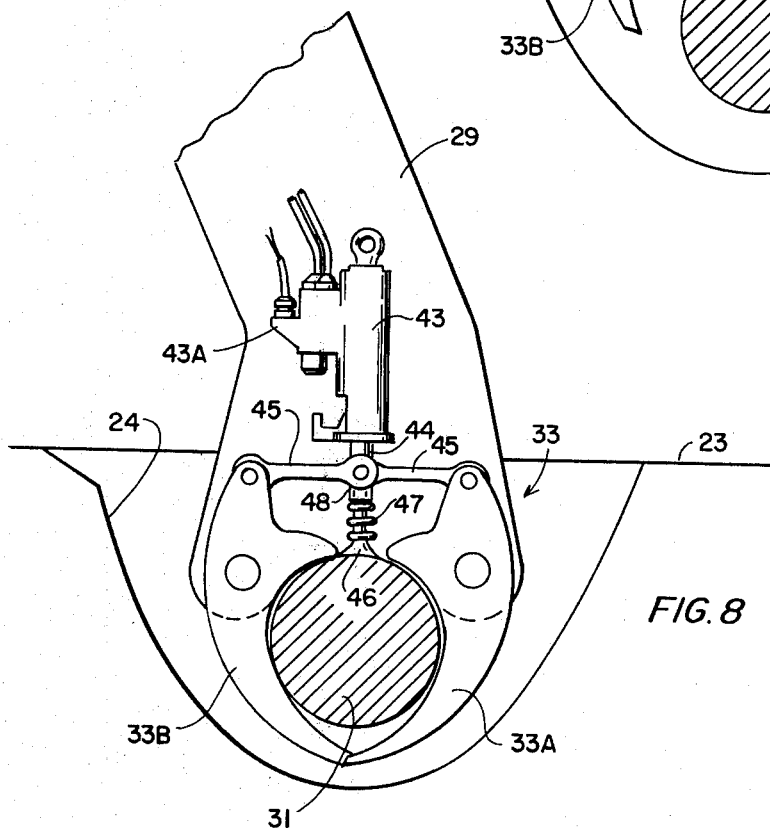

Turning now to FIGS. 7 and 8 there is shown a typical actuating assembly for one of the pairs of jaw means 33 carried in the probe member 29. In FIG. 7 the member 29 is shown aligned with the receptacle 24 and with the attachment elements 33A and 33B in open position. An actuator 43 carried in the member 29 in any suitable manner has its rod 44 connected to links 45 which, in turn, are connected to the jaw elements 33A and 33B. The lower end of the member 44 carries an abutment element 46 which is held in extended position by a spring 47. The abutment 46 can be forced to retract into the member 44 and forms the movable element of a signal device such as a linear potentiometer 48 carried in the member 44. As the member 29 brings the elements 33A and 33B into attachment position with the cross member 31 in receptacle 24 the abutment element 46 contacts the cross member 31 and recedes into member 44 to produce a signal that goes to a microprocessor called the probe control unit 69 (see FIG. 9) to be described later. The microprocessor 69 then commands the actuator 43 to retract the member 44 whereby the jaw elements 33A and 33B are closed about the member 31 in the manner shown in FIG. 8. The mechanism described in connection with FIGS. 7 and 8 is associated with each of the jaws 33 so that there is positive actuation of the jaws into and out of engagement with the cross member 31. If the actuator 43 fails to function as intended, the abutment element 46 will become effective to mechanically force the member 44 to close the jaw elements 33A and 33B about the cross member 31, and lock in position.

When the actuator 43 is fully retracted and the abutment element 46 is still partially depressed into member 44, the control unit or microprocessor 69 knows that the jaws 33 have successfully engaged the crossbar 31. The microprocessor 69 receives a feedback signal from the actuator position transmitter 43A for actuator 43 that the jaws have closed and it then commands the motor 40 (FIG. 6) in a direction to extend the member 35 so that the jaw 36 at its outer end will seek the receptacle 25 and effect engagement with the cross member 32 therein. While not shown, the jaw 36 is provided with an actuating assembly of the type shown in FIG. 7 so that there is positive closure of the jaw elements 36 and 37 on the cross member 32, and a stop signal is sent to motor 40.

In order to efficiently, quickly and reliably operate the probe 17 for joining or releasing two aircraft in flight it is necessary to be able to maneuver the probe 17 independently of the helicopter so as to relate the two aircrafts as pointed out above. Previous mechanisms, as in Richardson or Barkey or Bennett, have not disclosed a truly independently maneuverable probe mechanism. In Richardson, the hookup requires the manual engagement of a device which then permits the use of more secure attachment. In Barkey the mechanism required is a complicated system of links, and in Bennett the mechanism is substantially rigid and involves making contact at a plurality of attachment points spaced from the longitudinal center line of the fixed wing aircraft. These problems were avoided by providing a structural probe of the character disclosed herein which allows greater separation of the aircrafts making up the composite aircraft and greater stability between the two. Barkey and Richardson dealt with fixed wing to fixed wing and dirigible-fixed wing composite aircraft systems.

The maneuverable probe 17 of this invention is capable of being guided into a hookup by more than spatial movement of either or both of the aircrafts. The maneuverability is achieved by actuators which are operable in coordination with the normal aircraft control surfaces. As seen first in FIGS. 5 and 6 and partially seen in FIG. 9, the probe 17 is attached through assembly 28 having a universal joint 50 which will permit the probe 17 to be rotated on its longitudinal axis by an actuator 51 connected to a crank arm 51A carried by the upper member of the universal joint 50. Lateral movement of the probe 17 is controlled by an actuator 52, seen generally in FIG. 9A, but omitted in FIGS. 1 to 4 and 9 for clarity, while fore and aft movement is controlled by actuator 53. While the length of the probe 17 may be made adjustable, it is less complicated to select a fixed length for the probe and retract it so as not to interfere with the take-off or landing of the helicopter 14. However it is normal to allow for some change in length to accommodate shock loads. The shock loads are damped by forming the lower part of the universal joint assembly 28 as a cylinder 54 to receive a piston 55. The piston 55 is secured by pin 56 to the upper end of the probe 27 so it is in position to extend across the notch 57 and slide in the cylinder 54. The probe 27 is slidably mounted at 58 on the cylinder but retained by a flange 59. A rib 60 on the cylinder engages in a slot in the part 27 to keep the probe 28 from rotating. The probe 27 can pivot on the universal joint assembly 28 between extended positions, as seen in the several views, and a retracted position lying aft under the helicopter fuselage and between the main landing gear 14A. In moving the probe 17 into its retracted position, the actuator 51 is energized to rotate the probe so the means 35 will lie flat under the fuselage. It is understood that the attachment of the actuator 53 to the piston 54 is by a split ring 61 which is positioned around the lower end of the cylinder 54 under the flange 59. Thus the ring 61 does not interfere with the rotational movement of the piston 54 or the vertical movement of the probe 17.

Figure 9:
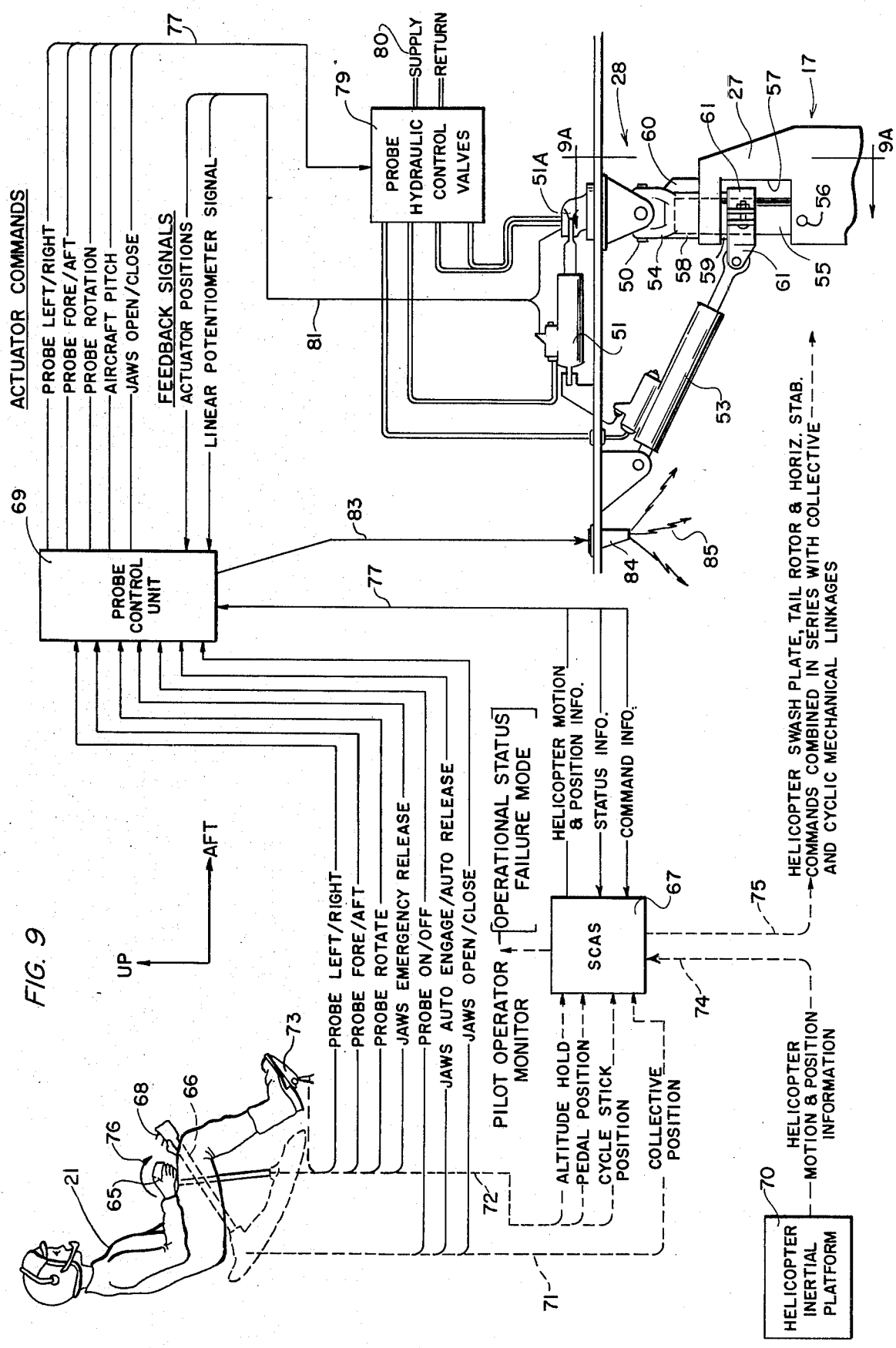

In FIG. 9, the probe operator 21 is seated in the helicopter 14 with the cyclic control 65 and the collective control 66 in his grasp. The operator 21 may be in the aft facing cargo station of the helicopter 14 which is designed much like a "crane" helicopter, but other positions are possible for either visual guidance of the probe 17 or guidance by closed circuit television (not shown). The operator 21 normally positions the helicopter 14 over the aircraft 18 or 22, and is provided with a stability and control augmentation system (SCAS) 67 to aid him in holding the helicopter position. The probe 17 is activated by a suitable switch 68 located on the collective control 66 so the hand hold will not have to be released. The operator effects probe control by applying bending moments or torsion on the top or hand grip of the cyclic control 65, these forces being detected by transducer sensors of the piezoelectric type (not shown) disposed in the hand grips. The sensors generate signals which are transmitted in a control by wire system to micrprocessor probe control unit 69 and to the SCAS unit 67. The control system operation is as follows:

Still referring to FIG. 9, it can be seen that the information from the usual inertial platform means 70 about the helicopter motion and position is fed into the SCAS unit 67, and that unit issues signals to the swash plate, tail rotor, and horizontal stabilizer in series with the collective and cyclic mechanical linkages. In order to distinguish between standard helicopter control means and the unique control means of the present embodiment, it will be sufficient to show the standard electrical control means in broken lines, and the improvements in full lines. Thus, the lead 71 from the collective control 66 feeds signals into the SCAS 67, while lead 72 feeds signals from the cyclic control 65 and foot pedal control 73 into the SCAS 67 along with the information from the inertial platform 70 through lead 74. The SCAS 67 analyzes this data and generates signals that are transmitted through lead 75 into helicopter swash plate, tail rotor and horizontal stabilizer commands in series with the usual linkages associated with the movements of the collective and cyclic sticks 66 and 65.

It can be appreciated that the force applied on the hand grip on the cyclic control 65 is picked up in a piezoelectric transducer (not shown) and the resulting signal produces probe left and right movement, fore and aft movement and rotation. Also a guarded button 76 located on the cyclic stick 65 can cause emergency release of the jaws 33 and 36. These signals are processed in the probe control unit 69. Switches 68 incorporated on the hand grip of the collective control 66 produce probe on or off conditions, jaws open or closed, or automatic engagement or release. Such signals are processed in the unit 69, along with information received by lead 77 from the SCAS unit 67. The probe control unit 69 transmits command signals through cable lead 77 to affect the movement of the probe 17 in each of its possible directions, operation of the aircraft pitch member 35, and actuation of the jaws 33 and 36. These signals or commands operate suitable fluid pressure control valves collectively indicated at 79, which are connected into a fluid pressure system 80. While the valves are not necessary to show, they effectively control the reversible actuation of fluid pressure motor means, such as actuator means 51 to rotate the probe 17, actuator means 52 (not shown in FIG. 9 for clarity) to move the probe 17 laterally and actuator means 53 to move the probe 17 fore and aft. In addition the pressure fluid system 80 also serves the actuator means 43 for the jaws 33, and motor means 40 for the pitch member 35. Actuator means 51, 52, 53, 43 and motor 40 are connected into a feedback lead 81, along with a signal connection from the potentiometer 48, associated with the probe control unit 69.

As an example, a forward bending moment applied to the grip of the cyclic control stick 65 sends a signal through the control unit 69 to operate a valve in the control valve assembly 79 associated with the means 53 to move probe 17 forward relative to the operator 21. A side bending moment of this grip sends a signal through the control unit 69 and control valve assembly 79 to means 52 (not shown in FIG. 9 for clarity) to cause probe 17 to move laterally. During this visual guidance of the probe 17, the unit 69 is constantly in communication with the stability and control augmentation system 67 to obtain inertial platform information and to exchange status information and commands. In the event of a failure of the SCAS 67, the probe operator 21 has his hands on the cyclic and collective sticks 65 and 66 so he can impose corrective action quickly.

During a normal engagement, the probe operator 21 selects automatic hook-up operation of the probe 17, on his collective stick 66. The operator then need only manuever the probe jaws 33 into the receptacle 24. As the bar 31 in receptacle 24 enters the jaw means 33, it depresses the abutment element 46 which generates a signal in potentiometer 48. That signal goes to the probe control unit 69 which in turn actuates the hydraulic valve assembly 79 to operate the actuator 43 in the probe 17 to close jaws 33A and 33B on the cross member 31. If potentiometer 48 or actuator 43 fails the abutment element 46 can force the jaws 33 to close and lock around the cross bar 31. The closing of jaws 33 is detected by a signal from the actuation position transmitter member 43A to the probe control unit 69 which in turn operates motor means 40 in a direction to drive gear 41 to advance the member 35 which is resiliently impelled in a down direction (not shown) to move its jaw element 37 along the surface 23 and into receptacle 25 when closing of the jaw 36 signals the control unit 69 to stop motor 40. Having effected the hook-up the composite aircraft can fly just as if the helicopter 14 were carrying an external load, and the SCAS 67 would function as it normally does to improve the helicopter flying quality. In the present embodiment, the SCAS is called upon to feed information to the probe control unit 69 that it needs for example for deciding at what pitch angle to hold the fixed wing aircraft through the member 35.

The release of the fixed wing aircraft 18 or 22 may be effected by selecting automatic disengagement. This is accomplished by hydraulically by-passing the motor 40 so that member 35 is free to move in or out until there is no load exerted by crossbar 32 on jaws 37. At this time the jaws 36 release or open and the member 35 is retracted by reverse operation of motor 40 to the position seen in FIG. 5. The main jaws 33 can then be opened to allow the fixed wing aircraft 18 or 22 to drop away from probe 17.

The dynamic forces present when attempting a hook-up with both aircraft in the air is more severe than in a ground hook-up, and air loads on the probe 17 complicate the operation. A helicopter generally has a very low moment of inertia about the roll axis, as compared with its pitch axis. Also roll damping and restoring forces are also very low as compared to the pitch axis which benefits from the horizontal stabilizer. The roll moments generated by the side-to-side probe actuator means while maneuvering the probe 17 for a hook-up can generate significant helicopter response about the roll axis. Accordingly, it may be necessary to use the actuator means 51 to rotate the probe so its aerodynamic shape, or airfoil cross-section, may be employed to move it laterally. Improvement of the coupled dynamics of the composite sytem, after hook-up, may be obtained by the hinged connection between probe members 26 and 29, along with the roll damper means 30A. This arrangement reduces roll oscillation of the fixed wing aircraft relative to the helicopter and greatly reducees the maximum amount of roll bending moment that could be transmitted up the probe 17 past the hinge 29.

Any designs that utilize fixed wing aircraft rotation will require some additional sophistication. One capability that is especially useful in the present system is the ability of the helicopter personnel to control the thrust of the fixed wing aircraft's engines and such other parameters in order to make a coordinated takeoff and rotation. This also has the beneficial side effect of taking the fixed wing pilot totally out of the control loop so that he needs very little specialized VTOL training.

The helicopter personnel can control the fixed wing aircraft's thrust in two ways. The first way is embodied in well known communication data link. Aircraft which have an Automatic Carrier Landing System (ACLS) can be controlled by a data link from the helicopter. The ACLS system allows the personnel in the helicopter to control the aircraft flight control surfaces as well as its engine thrust in order to improve the operation of the present system. The helicopter personnel, using this standard system, will be able to guide an aircraft in for a hook-up and assist in controlling it during take-off and landing. The probe control unit 69 thus takes on the additional chore of controlling some of the fixed wing aricraft's systems, by sending signals through coaxial cable 83 (see FIG. 9) to blade antenna 84, which radiates the control signal 85 to the ACLS (not shown) equipment in the fixed wing aircraft.

The second method is embodied in an electrical connection between the two vehicles. In this way a spring loaded multi-circuit contact carrier 86 can be suitably positioned at the bottom of the structural probe between the two pair of jaws (see FIG. 5). On the fixed wing aircraft another matching multi-contact receptacle 87 can be located inside a circumferential groove at the middle of the structural cross bar 31. During a hook-up the electrical contact carrier 86 from the probe 17 would drop into the receptacle 87 and make contact. Through this connection the probe control unit 69 will be able to hook into the ACLS or similar system and control the engine thrust and control surfaces of the fixed wing aircraft. The coaxial cable 83 and the blade antenna 84 are, of course, replaced by the electrical cables to contact carrier 86 and receptacle 87 originating at the probe control unit 69. After hook-up the fixed wing pilot would control his own thrust only as a backup in case of a system failure. In case of severe combat damage in a military composite aircraft, or inflight fires and emergencies, while the two aircraft are hooked up and at low speeds near the ground, a special emergency release procedure is available. When the probe operator 21 selects "emergency release", the left main probe jaw 33 opens before the right one. The weight of the aircraft 18 or 22 plus the force of the left actuator 43 pushing down on the cross bar 31 allows the aircraft 18 or 22 to roll to the left while the helicopter pulls away to the right, prior to complete release, so that the personnel in the aircraft 18 or 22 can eject out from under the helicopter rotor. An inhibitor is required to prevent an inadvertent ejection while the fixed wing aircraft is under the helicopter.

Turning now to FIG. 10 there is shown a modified connective device which is made up of the probe 17' and a conventional helicopter cable and locking hook assembly 88. The assembly 88 is secured in the helicopter 14 in any usual manner (not shown) so that its hook 89 can be connected to the upper end 90 of the probe 17'. The body of the probe 17' is of less length than the helicopter landing gear for ground clearance, and is formed as an airfoil with its leading edge 91 facing in the normal direction of helicopter forward flight. The outer or lower end of the probe 17' is sufficiently enlarged to house the jaws 33, and in addition lateral stabilizing means 34 and longitudinal stabilizing means 34A are provided, as in the previous showing of FIG. 5. The probe 17' is provided with maneuvering means along its trailing edge in the form of a split rudder and brake assembly 92. The rudder and brake comprises a pair of hinged surfaces 93 and 94 supported on suitable arms 95. The lower arm 95 serves as the mount for a pair of actuators 96 and 97 operatively connected to the surfaces 93 and 94 respectively. These actuators position the surfaces as desired so that when the surfaces are opened they increase the drag on the probe 17' and cause it to move aft relative to the flight direction. The probe 17' can be maneuvered laterally by varying the relative movement of the surfaces so that one surface is moved more or less than the other.

The probe 17' may rely upon the air flow while the helicopter is in translational flight, but of course cannot do so when the helicopter is in hover. To overcome that problem, the probe 17' may be provided with a ducted fan assembly 98 mounted at its trailing edge in alignment with the surfaces 93 and 94. The air flow created by this fan assembly 98 will accomplish the desired control which is important during making a hook-up with a fixed wing aircraft or a load carrying pod standing on the ground. Electrical power for the fan assembly 98, for the jaws 33, and for the activators 96 and 97 is supplied through the winch cable and is picked up in the probe 17' by the lead 99 being plugged into a receptacle provided in the hook 89.

FIG. 11 shows that the probe 17 can perform the functions above described as well as other operations, such as aerial refueling with fuel pod 100. The ability of the probe 17 to maneuver below the helicopter 14 and/or automatically engage a payload makes it valuable for a number of missions, and makes it possible to switch roles rapidly. The previously described data link systems in the helicopter, such as either radio frequency communication or electrical contact at the end of the probe, which was previously used to control certain fixed wing aircraft parameters, may now be used to communicate with and control the functioning of an aerial refueling, anti-submarine warfare (ASW), or other type of pod (not believed necessary to show). With this system the helicopter for example, will be able, after launching an aircraft from a small ship, to immediately pick up a refueling pod and refuel another aircraft flying over head, or pick up an ASW pod and be ready to perform anti-submarine warfare with minimal assistance required from ground personnel.

The improvements above described relate to uses of helicopters for a number of important functions. In order to achieve those ends it is of primary importance to be able to operate the probe means carried by the helicopter so it will not interfere with the landing and take-off maneuvers. It is also important to be able to maneuver the probe independently of the helicopter or fixed wing aircraft, and to provide for using the thrust of a fixed wing aircraft to assist in the take off and landing when the helicopter and fixed wing aircraft are to be joined as a composite aircraft. A further important feature of the present disclosure is found in the improvement of being able to extend the spacing between the aircraft for increased safety without interferring with the operation of the helicopter.

What is claimed is:

1. In a composite aircraft consisting of a rotary wing aircraft and a fixed wing aircraft, the improvement which comprises: a single elongated probe means for spatially interconnecting said aircrafts with said rotary wing aircraft above said fixed wing aircraft; means operably connecting said probe means to said rotary wing aircraft for movement relative to said rotary wing aircraft; cooperative means on said probe means and on said fixed wing aircraft to engage each other for securing the aircrafts together, said cooperative means on said fixed wing aircraft being close to the center of gravity of said fixed wing aircraft; and cooperative means between said probe means and said fixed wing aircraft for controllably pitching said fixed wing aircraft such that the thrust of said fixed wing aircraft propulsion is directed to assist the flight system of the composite aircraft.

2. In a composite aircraft consisting of a rotary wing aircraft and a separate fixed wing aircraft, the improvement of means on each of said aircraft for establishing a spatial connection between the separate aircrafts, said means on said rotary wing aircraft being operable for establishing said spatial connection including first means engaging said fixed wing aircraft close to its center of gravity, and second means engaging said fixed wing aircraft to one side of its center of gravity for positioning said fixed wing aircraft into a nose up pitched attitude for combining the lifting thrust of said rotary wing aircraft and the propulsive thrust of the fixed wing aircraft in the flight system of the composite aircraft.

3. In a composite aircraft consisting of a rotary wing aircraft and a separate fixed wing aircraft, the improvement of means on each of said aircraft for establishing a spatial connection between the separate aircraft, means establishing said connection comprising an elongated probe body having an operative connection at one end with said rotary wing aircraft and a pivotal connection with said fixed wing aircraft adjacent its opposite end, said pivotal connection allowing said fixed wing aircraft freedom to adjust its longitudinal position relative to said rotary wing aircraft, and said elongated probe body including means operative to damp the relative roll of the rotary wing aircraft and the fixed wing aircraft for opposing bending of said elongated probe body.

* * * * *

UNITED STATES PATENT AND TRADEMARK OFFICE
CERTIFICATE OF CORRECTION

PATENT NO. : 4,267,987

DATED : May 19, 1981

INVENTOR(S) : William R. McDonnell

It is certified that error appears in the above—identified patent and that said Letters Patent is hereby corrected as shown below:

Column 1, line 19, "point" should be "points"

Column 1, line 63, "assitance" should be "assistance"

Column 2, line 23, "elevations" should be "elevational"

Column 9, line 8, "reducees" should be "reduces"

Column 9, line 42, "jaws (see Fig. 5)." should read "jaws 33 (see Fig. 5).

Signed and Sealed this

Twenty-fifth Day of August 1981

[SEAL]

Attest:

Attesting Officer

GERALD J. MOSSINGHOFF

Commissioner of Patents and Trademarks